(12) United States Patent
Izumi

(10) Patent No.: US 6,564,948 B2
(45) Date of Patent: May 20, 2003

(54) SOLID-LIQUID SEPARATING APPARATUS

(75) Inventor: Shunji Izumi, Matsumoto (JP)

(73) Assignee: Izumi Products Company, Nagano (JP)

( * ) Notice: Subject to any disclaimer, the term of this patent is extended or adjusted under 35 U.S.C. 154(b) by 0 days.

(21) Appl. No.: 09/858,072

(22) Filed: May 15, 2001

(65) Prior Publication Data
US 2001/0050249 A1 Dec. 13, 2001

(30) Foreign Application Priority Data

May 16, 2000 (JP) ........................................ 2000-143909

(51) Int. Cl.⁷ ............................................ B01D 33/067
(52) U.S. Cl. ......................... 210/396; 210/402; 210/488
(58) Field of Search ................................. 210/396, 402, 210/407, 488

(56) References Cited

U.S. PATENT DOCUMENTS

| | | |
|---|---|---|
| 1,649,581 A | 11/1927 | Genter et al. |
| 1,905,806 A | 4/1933 | Clark |
| 2,547,941 A | 4/1951 | Heftler |
| 2,814,389 A * | 11/1957 | Hoare ........................ 210/396 |
| 3,096,278 A | 7/1963 | Francom |
| 3,616,914 A | 11/1971 | Reid |
| 3,625,362 A | 12/1971 | Sicard |
| 3,643,806 A | 2/1972 | O'Cheskey |
| 4,146,481 A | 3/1979 | Nagaoshi et al. |
| 4,147,633 A | 4/1979 | Kato |
| 4,153,557 A | 5/1979 | Hori |
| 4,279,750 A | 7/1981 | Hori |
| 4,752,394 A * | 6/1988 | McKenzie et al. .......... 210/488 |
| 4,872,404 A | 10/1989 | Quetsch et al. |
| 5,026,487 A | 6/1991 | Abdulmassih |
| 5,118,414 A | 6/1992 | Byers |
| 5,122,271 A * | 6/1992 | Simon et al. ............... 210/488 |
| 5,228,987 A | 7/1993 | Arvanitakis |
| 5,389,256 A | 2/1995 | McEwen et al. |
| 5,618,424 A * | 4/1997 | Nagaoka ..................... 210/402 |
| 5,656,162 A | 8/1997 | Nilsson |
| 6,332,545 B1 * | 12/2001 | Izumi ........................ 210/396 |

FOREIGN PATENT DOCUMENTS

| | | |
|---|---|---|
| AU | 549480 | 1/1986 |
| DE | 1047170 | 10/1955 |
| GB | 1113114 | 5/1968 |
| GB | 1200208 | 7/1970 |
| JP | 2000-317693 | 11/2000 |
| NL | 8701313 | 1/1988 |

* cited by examiner

Primary Examiner—Christopher Upton
(74) Attorney, Agent, or Firm—Koda & Androlia

(57) ABSTRACT

A solid-liquid separating apparatus including a strainer of a cylindrical shape. The strainer is comprised of circular ring members arranged side by side with gaps in between and disposed inside an accommodating section the device casing. The circular ring members comprise end-part circular ring members at both ends of the strainer and a plurality of intermediate circular ring members disposed between the end-part circular ring members and have inward projections projecting from their inner circumferential surfaces. A plurality of lateral bridge members are installed between the end-part circular ring members, and these bridge members have engaging parts that engage with the respective inward projections of the intermediate circular ring members so as to hold the intermediate circular ring members.

4 Claims, 11 Drawing Sheets

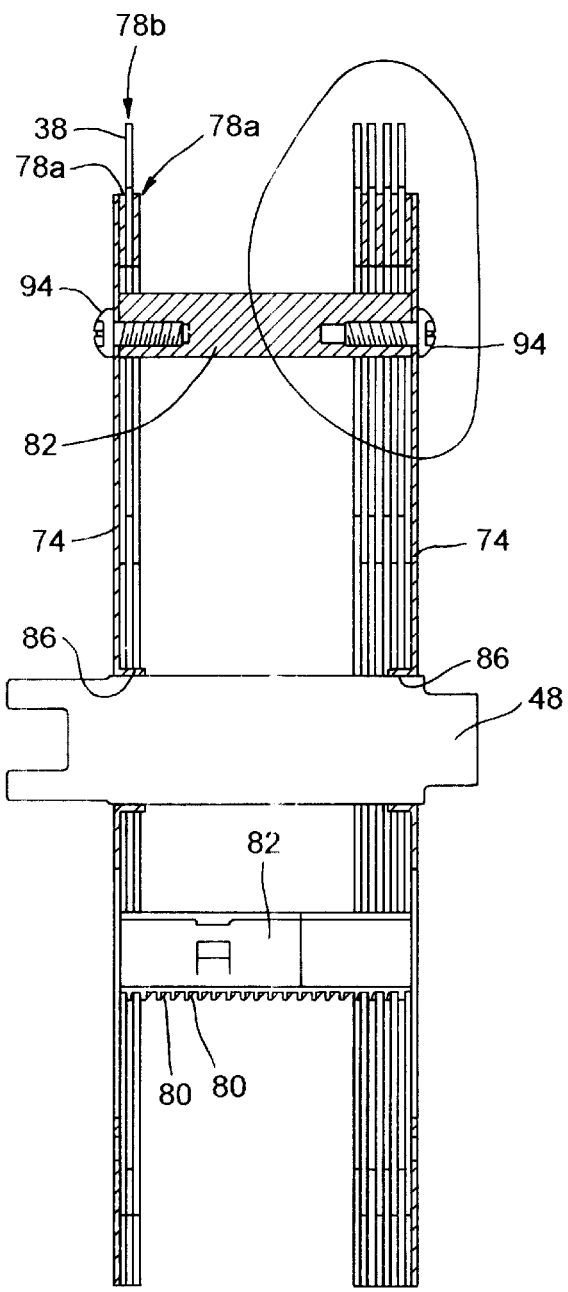
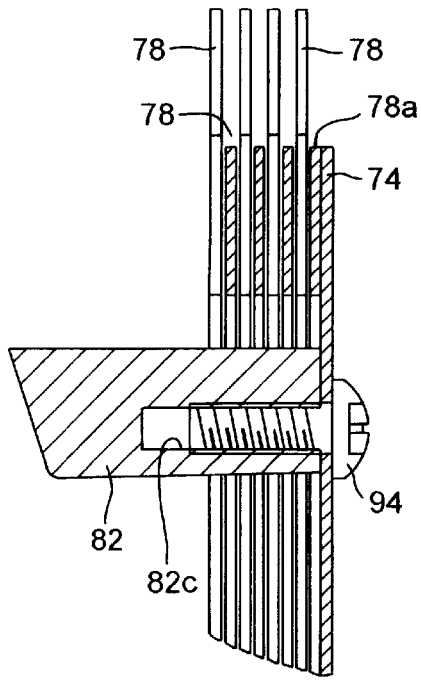
FIG. 9B
FIG. 9A

SOLID-LIQUID SEPARATING APPARATUS

BACKGROUND OF THE INVENTION

1. Field of the Invention

The present invention relates to a solid-liquid separating apparatus for separating solid matter, raw contaminants, etc. from liquid of a solid-liquid mix.

2. Prior Art

Solid-liquid separating apparatus are used in, for example, raw contaminant dehydration treatment devices, etc. installed in kitchen sinks. Such solid-liquid separating apparatus separates the solid matter and liquid from water-containing raw contaminants produced as a mixture of solid matter and liquid by mixing raw contaminants discharged from the kitchen with water and pulverizing this mixture.

One of such solid-liquid separating apparatuses is described in Japanese Patent Application No. H11-133089 (Laid-Open (Kokai) No. 2000-317693) filed by the inventor of the a present application.

This prior art solid-liquid separating apparatus will be described with reference to FIGS. 11 and 12.

The solid-liquid separating apparatus 10 is substantially comprised of a strainer 12, a casing 24 and a scraper 20.

The strainer 12 is in a cylindrical shape by way of arranging a plurality of flat-plate-form circular ring members 14 adjacent each other with specified gaps between the circular ring members 14.

The casing 24 has an accommodating section 26 that accommodates the strainer 12. The accommodating section 26 is divided by the strainer 12 into two regions: an internal region B that is inside the strainer 12 and an external region C that is outside the strainer 12. An intake port 28 that introduces a mixture of solid matter and a liquid is formed in the external region C, and an outlet port 30 that discharges to the outside the liquid that passes between the circular ring members 14 and advances into the internal region B is formed in the internal region B.

The scraper 20 includes flat-plate-form protruding elements 22. Tip ends of the protruding elements 22 advance into the gaps between the circular ring members 14. The scraper 20 is moved along the outer circumferential surfaces of the circular ring members 14 so that solid matter adhering to the end surfaces (which are flat surfaces and may also be called the side surfaces) of the circular ring members 14 is removed.

In operation, the strainer 12 acts as a filter. In other words, the liquid 18 passes through the gaps between the stacked circular ring members 14 and advances into the internal region B, and the solid matter 16 that is larger than the gaps is deposited on the outer circumferential surfaces of the circular ring members 14. Some of the solid matter 16 that can advance into the gaps adhere to the end surfaces of the circular ring members 14 and cannot advance into the internal region B. As a result, the solid matter and liquid are separated.

The liquid 18 that has advanced into the internal region B is discharged to the outside of the casing 24 via the outlet port 30. The solid matter 16 adhering to or deposited on the circular ring members 14 is scraped away by the scraper 20 and discharged to the outside of the casing 24 via the discharge opening 34 that is opened in the casing 24. Since the solid matter 16 deposited or adhering on the outer circumferential surfaces and end surfaces of the circular ring members 14 is scraped away by the scraper 20 each revolution of the strainer 12, no clogging would occur; and solid-liquid separation is continuously performed.

The space of the gaps between the end surfaces of the respective circular ring members 14 that make up the strainer 12 is determined based upon the size of the solid matter that is to be separated from the liquid. More specifically, if it is desired to separate even solid matter 16 of a small size so that the proportion of solid matter contained in the liquid 18 following the separation is reduced and the quantity of contaminants in the liquid 18 is thus reduced, then the spacing of the gaps between the circular ring members 14 is narrowed. For the opposite case, the spacing of the gaps between the circular ring members 14 is widened to some extent.

FIGS. 13 through 15 show the solid-liquid separating apparatus 10 in a concrete manner. The solid-liquid separating apparatus 10 comprises the strainer 12, the casing 24, the scraper 20 and a driving device 36 that rotationally drives the strainer 12.

The strainer 12 is formed into a cylindrical body by stacking sideways a plurality of circular ring members 14 with gaps between these circular ring members 14. The circular ring members 14 consist of two types of ring members: flat-plate-form first circular ring members 14a, and flat-plate-form second circular ring members 14b. The second circular ring members 14b have the same external diameter as the first circular ring members 14a, and a plurality of outer projections 38 (in FIG. 13, three outer projections 38) are formed at specified angular intervals on the outer circumferential surface of the second circular ring members 14b.

More specifically, the strainer 12 is formed in a cylindrical body. This cylindrical strainer 12 is obtained by stacking a plurality of the respective circular ring members 14a and 14b side by side with specified gaps between the respective circular ring members 14a and 14b. A specified number of first circular ring members 14a (for instance, a single first circular ring member 14a in FIGS. 14 and 15) are interposed between two second circular ring members 14b.

Furthermore, spacers 44 are fitted over first stays 42 that pass through through-holes 40 formed in the respective circular ring members 14a and 14b and integrally connect all of the circular ring members 14a and 14b. Thus, the spacers 44 are used as a means for setting the spacing of the circular ring members 14a and 14b. The thickness of the spacers 44 constitutes the size of the spacing of the gaps between the respective circular ring members 14a and 14b.

Spokes 46 of a Y-shape, for instance, are formed so as to be connected to the inner edges of the circular ring members 14a and 14b; and a rotating shaft 48 is installed in the center of these spokes 46. Both ends of the rotating shaft 48 are rotatably supported on the casing 24. At least one end of the rotating shaft 48 protrudes to the outside of the casing 24, and this end is rotationally driven by the driving device 36. The strainer 12 is thus rotated in the direction indicated by the curved arrow in FIG. 13.

The second circular ring members 14b which have the outer projections 38 on their outer circumferential surfaces are arranged so that the outer projections 38 form the ribs 50 on the outer circumferential surface of the strainer 12. Thus, the ribs 50 extend in the axial direction of the strainer 12. In other words, when the strainer 12 is viewed from one end thereof, the outer projections 38 of one second circular member 14b is positioned directly behind the outer projections 38 of the next second circular ring member 14b so that the ribs 50 are formed by these outer projections 38. As a result, a plurality of ribs 50 that extend parallel to the axis of the strainer 12 are formed on the outer circumferential surface of the strainer 12. Since the first circular ring members 14a that have no outer projections 38 are interposed between the second circular ring members 14b, spaces are formed in the ribs 50.

The ribs 50 push and transfer the separated solid matters 16 to the discharge opening 34 along the inner surface of the tubular accommodating section 26.

The strainer 12 is installed inside the tubular accommodating section 26 so that the axis of rotation of the strainer 12, i.e., the rotating shaft 48 that is connected to the strainer 12, is oriented in a horizontal direction. The openings at both ends of the strainer 12 are closed off by a pair of opposite inside wall surfaces of the tubular accommodating section 26 of the casing 24. Thus, the movement of the liquid between the outer region C and inner region B of the strainer 12 is accomplished mainly by the gaps between the circular ring members 14a and 14b.

In the solid-liquid separating apparatus 10 shown in FIG. 13, the intake port 28 is located at a lower position than the outlet port 30. Thus, the mixture constantly accumulates in the lower portion of the tubular accommodating section 26, the lower portion of the strainer 12 is immersed in the mixture, and the upper portion of the strainer 12 is exposed above the liquid level F of the mixture.

The discharge opening 34 is opened in the upper portion of the tubular accommodating section 26 so that the discharge opening 34 is located in the outer region C of the strainer 12. The discharge opening 34 extends in the direction of the axis of rotation of the strainer 12, so that it allows the solid matter 16, that has been separated from the liquid and carried along the inner circumferential surface of the tubular accommodating section 26 by the ribs 50, to be discharged to the outside of the casing 24.

The discharge opening 34 opens into the space of the tubular accommodating section 26 above the liquid level F of the mixture. The discharge opening 34 is located on the downstream side of the top area T of the strainer 12 with respect to the direction of rotation D of the strainer 12 and is on the upstream side of the scraper 20 with respect to the direction of rotation D of the strainer 12.

A cover member 52 is disposed on the discharge opening 34 of the casing 24 so as to close the discharge opening 34. More specifically, one end of the cover member 52 is pivotally connected to the edge of the discharge opening 34 located on the upstream side of the discharge opening 34 with respect to the direction of rotation D of the strainer 12, so that the other end of the cover member 52 that is on the downstream side with respect to the direction of rotation D of the strainer 12 is moved or swings toward and away from the discharge opening 34 as indicated by two-head arrow in FIG. 13.

The cover member 52 is constantly urged toward the strainer 12 by an urging means such as a spring, 54. The spring 54 is coupled at one end thereof to the casing 24 and at another end thereof to the cover member 53.

By way of bias of the spring 54, the cover member 52 presses the solid matter 16 that is pushed and moved by the ribs 50 of the strainer 12 against the outer circumferential surface of the strainer 12 and squeezes the liquid out of the solid matter 16.

As seen from FIG. 15, the scraper 20 is constructed by stacking sideways a plurality of flat plates. As shown in FIG. 13, the scraper 20 is disposed on the downstream side of the top area of the strainer 12 with respect to the direction of rotation D of the strainer 12. In addition, the scraper 20 is disposed near the discharge opening 34 so that it is located on the downstream side of the discharge opening 34 with respect to the direction of rotation D of the strainer 12.

The scraper 20 will be further described below in regards to its more concrete structure.

The scraper 20 is comprised of plate-form first protruding elements 56, plate-form second protruding elements 58 and supporting elements 60.

Each of the first protruding elements 56 is formed from a plate material that has the same thickness as that of the respective first circular ring members 14a that make up the strainer 12, and the tip end (upper end in FIG. 15) of the first protruding element 56 protrudes toward the outer circumferential surface of each one of the first circular ring members 14a so as to scrape away solid matter 16 adhering to the outer circumferential surfaces of the first circular ring members 14a.

Each of the second protruding elements 58 is formed from a plate material that has the same thickness as each one of the gaps between the first circular ring members 14a and second circular ring members 14b. The tip end (upper end in FIG. 15) of the second protruding element 58 advances into the gaps between the first and second circular ring members 14a and 14b so as to scrape away solid matter 16 adhering to the respective flat surfaces of the circular ring members 14a and 14b.

Each of the supporting elements 60 is formed from a plate material that has the same thickness as that of the respective second circular ring members 14b that are formed with outer projections 38 on their outer circumferential surfaces.

The first protruding elements 56, second protruding elements 58 and supporting elements 60 are, as seen from FIG. 14, disposed in a specified order in accordance with the disposing order of the first circular ring members 14a and second circular ring members 14b that make up the strainer 12. More specifically, the first protruding elements 56 are positioned so as to face the circumferential surfaces of the first circular ring members 14a, the second protruding elements 58 are positioned so that pointed end areas thereof enter into the gaps between the circular ring members 14a and 14b, and the supporting elements 60 are positioned so as to face the circumferential surfaces of the second circular ring members 14b. The first protruding elements 56, second protruding elements 58 and supporting elements 60 are further formed into an integral unit by second stays 64 that pass through through-holes 62 formed in these elements.

In this structure, the gaps between the respective circular ring members 14a and 14b are set to be smaller than the thickness of the respective circular ring members 14a and 14b. As a result, the thickness of the second protruding elements 58 that advance into the gaps between the respective circular ring members 14a and 14b is smaller than the thickness of the circular ring members 14a and 14b. Thus, the strength of the second protruding elements 58 might be insufficient. Accordingly, the second protruding elements 58 are reinforced by being interposed between the first protruding elements 56 and the supporting elements 60 that are positioned on both sides of the second protruding elements 58.

In the structures shown in FIGS. 14 and 15, the first circular ring members 14a are positioned at both ends of the strainer 12 (which is a cylindrical shape as a whole). Accordingly, the first protruding element 56, the second protruding element 58 and the supporting element 60 are disposed in this order from one end of the scraper 20, thus forming a "unit"; and this "unit" is repeated in the direction of the second stays 64, and the first protruding element 56 is disposed at another end of the scraper 20.

In the structure shown in FIG. 15, the first protruding elements 56a which are positioned at both ends of the scraper 20 differ in shape from other first protruding elements 56 positioned in the intermediate portions of the scraper 20. In other words, the first protruding elements 56a at both ends are larger and have a broader area compared to other first protruding elements 56. The intention is to have these first protruding elements 56a at both ends hold the cover member 52 (positioned on the upstream side of the scraper 20 with respect to the direction of rotation D of the strainer 12) from both sides so that both ends of the cover member 52 are covered by these first protruding elements 56a.

The solid material 16 transferred by the strainer 12 are scraped away while being traveling downward from the top area of the strainer 12, thus being separate from the strainer 12 and discharged out of through the discharge opening 34.

However, the solid-liquid separating apparatus described above has problems.

The solid-liquid separating apparatus involves the spacers 44 that are used to secure the gaps between the end (flat) surfaces of the respective circular ring members 14. As a result, the spacers 44 need to be respectively fitted one at a time over a plurality of first stays 42 each time a circular ring member 14 is inserted and stacked thereon. This requires careful work on the part of the worker. In other words, increased labor is required for assembling the strainer 12, and this results in an increase in the cost of manufacturing.

Furthermore, due to the variations in the thickness dimensions of the circular ring members 14 and spacers 44, a cumulative error is created in the axial dimension of the strainer 12 that is formed by the circular ring members 14 and the spacers 44. As a result, there may be cases in which the length of the strainer 12 does not match the length of the first stays 42.

SUMMARY OF THE INVENTION

Accordingly, the object of the present invention is to solve the problems with the prior art solid-liquid separating apparatus.

More specifically, the object of the present invention is to provide a solid-liquid separating apparatus that includes a strainer formed by a plurality of circular ring members with specified gaps in between, thus making possible to use no spacers seen in the prior art separating apparatus.

The above object is accomplished by a unique structure for a solid-liquid separating that is comprised of:

a strainer that is a cylindrical body formed by a plurality of flat-plate-form circular ring members with gaps in between;

a casing with an accommodating section for accommodating therein the strainer, the accommodating section being divided by the strainer into an internal region that is inside the strainer and an external region that is outside the strainer, an intake port that introduces a mixture of solid matter and liquid being formed in the external region, and an outlet port that discharges to the outside the liquid that passes between the circular ring members and advances into the internal region being formed in the internal region, and a scraper that has flat-plate-form protruding elements whose tip ends advance into the gaps between the circular ring members, the scraper being moved along the outer circumferential surfaces of the circular ring members so as to scrape away the solid matter adhering to the circular ring members, wherein the unique structure of the present invention is that the strainer is comprised of:

a pair of end-part circular ring members disposed at both ends of the strainer, a plurality of intermediate circular ring members disposed between the pair of end-part circular ring members and have inward projections projecting from the inner circumferential surfaces, and a plurality of lateral bridge members installed between the pair of end-part circular ring members, each of the lateral bridge members being formed with a plurality of engaging parts that engage with the inward projections of the intermediate circular ring members and hold the intermediate circular ring members with the gaps between the circular ring members, and the engaging parts being lined up in the direction of the length of each the lateral bridge members.

With the structure above, spacers that are fitted over first stays while the first stays are passed through a plurality of circular ring members so that the spacers are disposed between the respective circular ring members as in the prior art are not required. Accordingly, the working characteristics in assembling the strainer are improved.

Furthermore, the total length of the strainer that is formed by the circular ring members is defined by the length of the lateral bridge members (or more specifically, by the length that is obtained by adding the thickness of the end-part circular ring members to this lent length of the lateral bridge members). Accordingly, any cumulative error would not be generated by the thickness differences in the circular ring members as in the prior art.

The engaging parts are formed so as to be lined up in a row on one side of each lateral bridge member. Alternatively, the engaging parts may be formed so as to be in one row on each side of each lateral bridge member so that the engaging parts in two rows are staggered. When the staggered engaging parts bridge member is used, the spacing of the gaps between the intermediate circular ring members becomes half the spacing of the one row engaging parts bridge member. This half spacing can be realized without varying the spacing of the engaging parts formed on one row on one side of each lateral bridge member by alternately engaging the intermediate circular ring members with the engaging parts of the staggered engaging parts.

Furthermore, in the solid-liquid separating apparatus of the present invention, each one of the intermediate circular ring members of the strainer can be formed on its inner circumferential surface with bifurcated projections that project inwardly, so that a plurality of second lateral bridge members are engaged with the bifurcated projections. The second lateral bridge members are provided between the pair of end-part circular ring members and restrict the rotation of the intermediate circular ring members relative to the end-part circular ring members. With this structure, the relative rotation between the circular ring members can be prevented without using first stays seen in the prior art separating apparatus. Furthermore, the assembly work of the strainer is generally simpler when the second lateral bridge members are employed and engaged with the bifurcated projections than in the case of assembling a strainer using the stays as in the prior art.

BRIEF DESCRIPTION OF THE DRAWINGS

FIG. 9A is a sectional view of the strainer, and FIG. 9B is an enlarged illustration of the area circled in FIG. 9A;

DETAILED DESCRIPTION OF THE INVENTION

Figure 1:
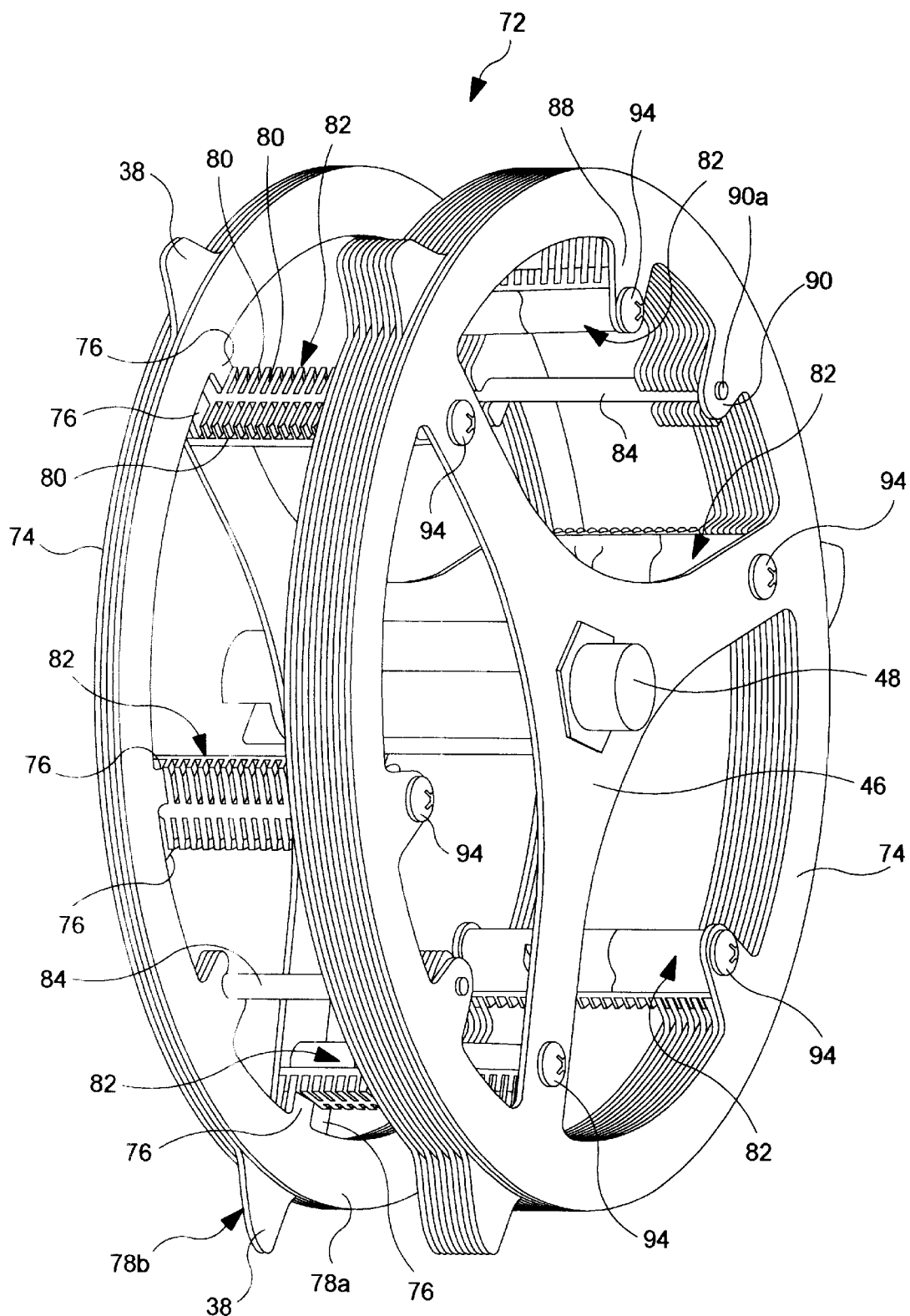
FIG. 1 is a perspective view of one embodiment of the strainer used in the solid-liquid separating apparatus of the present invention.

Preferred embodiments of the solid-liquid separating apparatus of the present invention that is referred to by the reference numeral 70 will be described in detail below with reference to the accompanying drawings.

The structure and function of the solid-liquid separating apparatus 70 is substantially the same as that of the solid-liquid separating apparatus 10 described as a prior art. The same reference numerals are used for the same constituting elements of the present invention described below, and the description of such elements is omitted.

Figure 13:
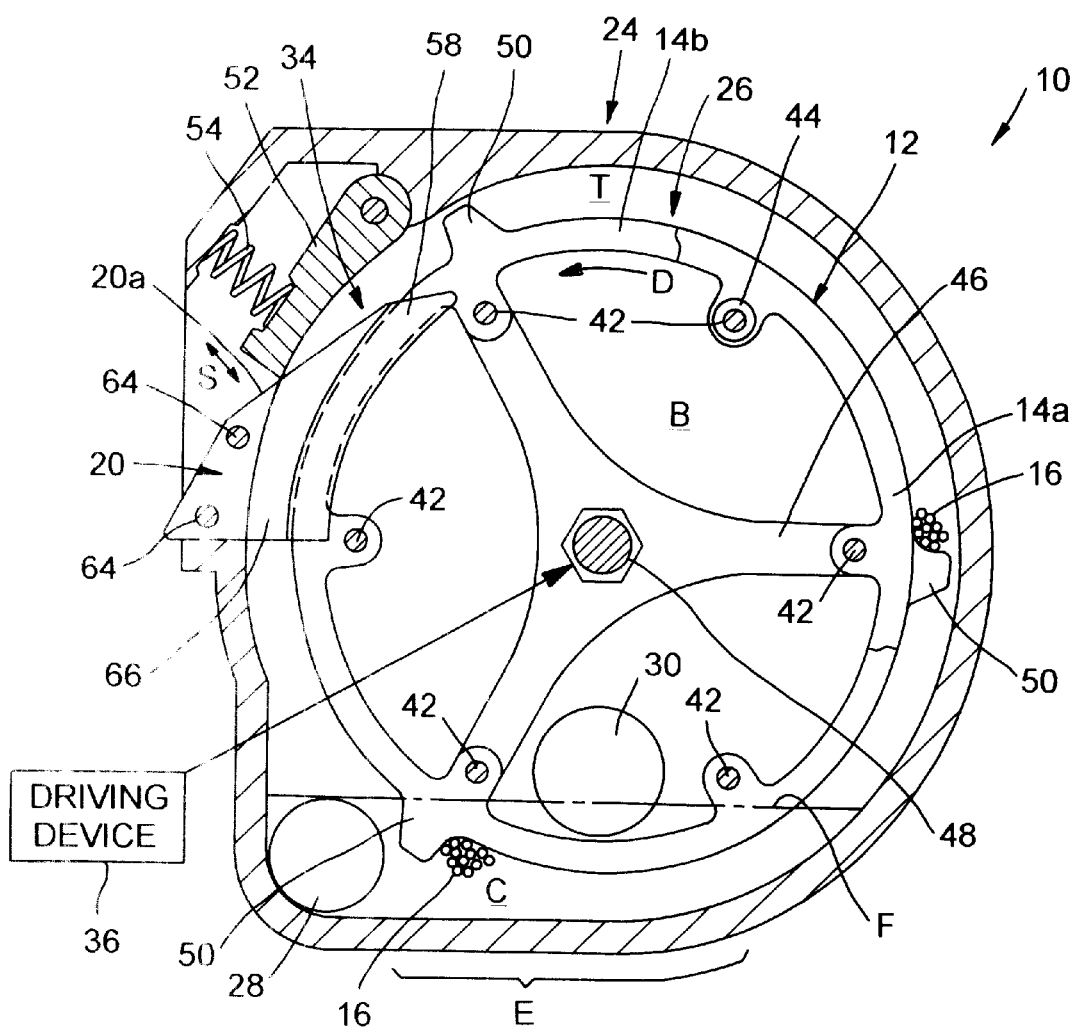
FIG. 13 is a sectional front view of the prior art solid-liquid separating apparatus.
Figure 14:
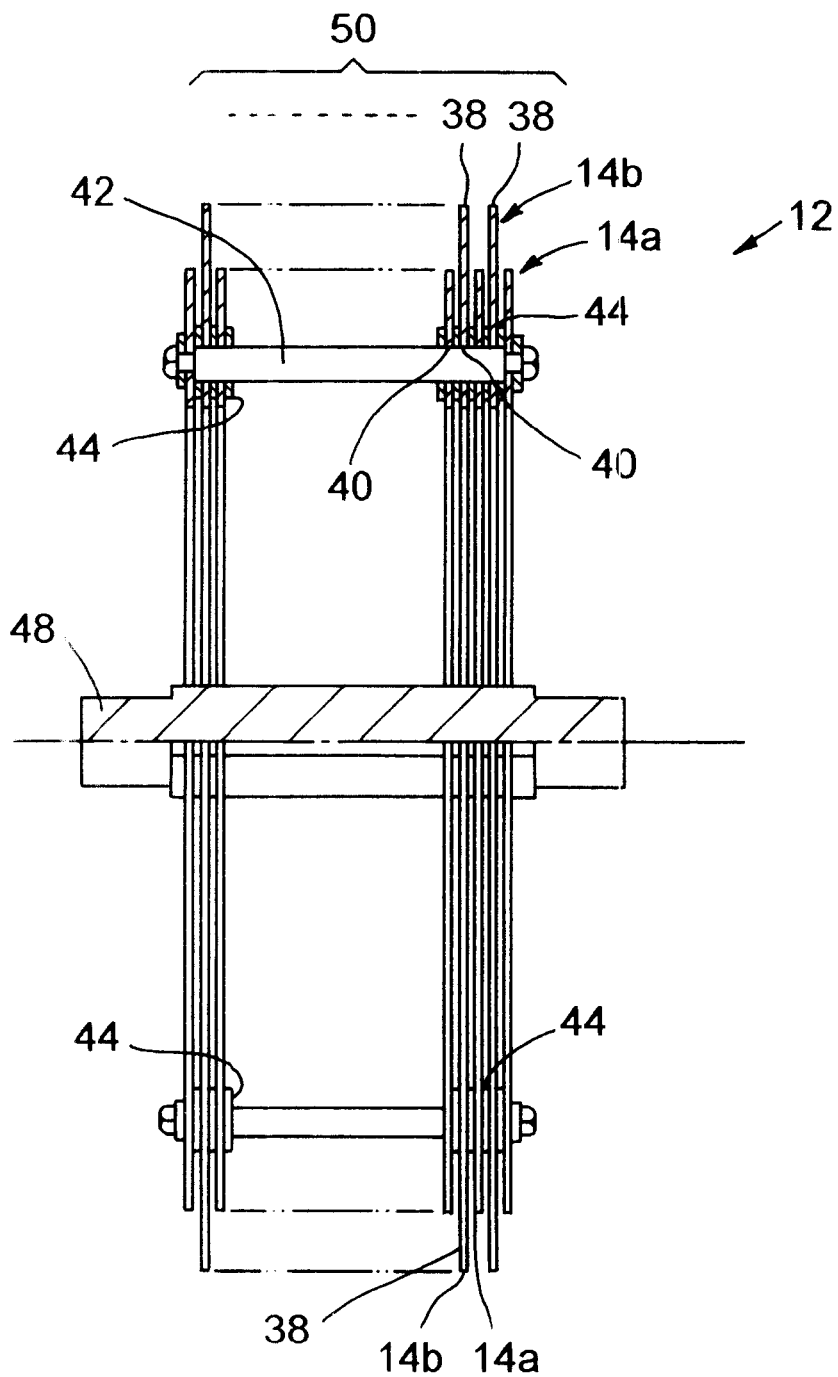
FIG. 14 is a sectional view of the strainer of the separating apparatus shown in FIG. 13.
Figure 15:
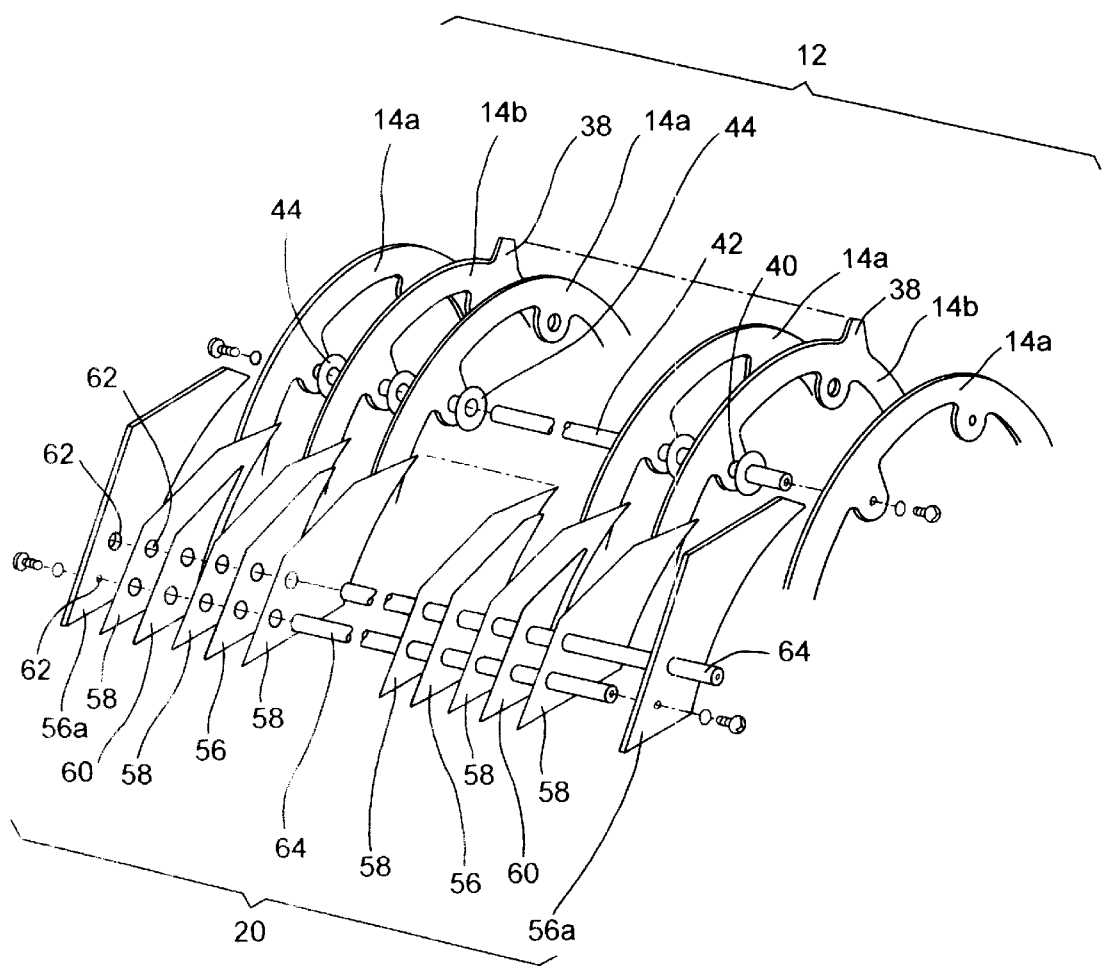
FIG. 15 illustrates the structure of the strainer and the scraper of the separating apparatus shown in FIG. 13.

The solid-liquid separating apparatus 70 is, like the one shown in FIG. 13, comprised of a strainer 72, a casing 24, a scraper 20 and a driving device 36 that rotates the strainer 72. The solid-liquid separation is performed in the same manner as in the solid-liquid separating apparatus 10 shown in FIG. 13.

The characterizing features of the solid-liquid separating apparatus 70 of the present invention lie in the structure of the strainer 72. The overall structure of the strainer 72 in the solid-liquid separating apparatus 70 of the present invention is shown in FIG. 1.

The structure of this strainer 72 will be described in detail with reference to FIGS. 1 through 10.

As seen from FIG. 1, the strainer 72 is comprised of a pair of end-part circular ring members 74, a plurality of intermediate circular ring members 78a and 78b, and a plurality of lateral bridge members 82.

The end-part circular ring members 74 are disposed at both ends of the strainer 72.

The intermediate circular ring members, more specifically, the first intermediate circular ring members 78a and the second intermediate circular ring members 78b, are disposed between the pair of end-part circular ring members 74. Each of the intermediate circular ring members is formed with inward projections 76 that project inwardly from the inner circumferential surface of the intermediate circular ring member.

The lateral bridge members 82 are installed so as to extend between the pair of end-part circular ring members 74. Each of the lateral bridge members 82 is formed on its surface a plurality of engaging parts 80 that engage with the respective inward projections 76 of the intermediate circular ring members 78a and 78b and holds the intermediate circular ring members 78a and 78b with specified gaps in between. The engaging parts 80 are lined up spacedly in the direction of length (that is indicated by two-head arrow L' in FIG. 5) of the lateral bridge member 82.

The strainer 72 further includes a plurality of second lateral bridge members 84 which are installed so as to extend between the pair of end-part circular ring members 74. Each second lateral bridge member 84 engages with the intermediate circular ring members 78a and 78b, thus preventing the intermediate circular ring members 78a and 78b from rotating relative to the end-part circular ring members 74.

Figure 2:
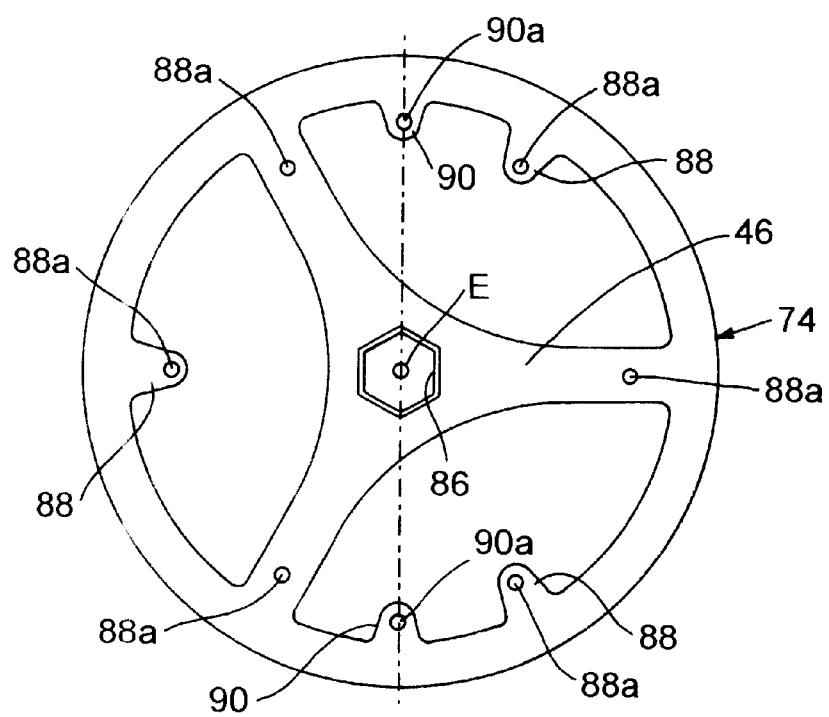
FIG. 2 shows one of the end-part circular ring members that make up the strainer of FIG. 1.

As best seen from FIG. 2, each of the end-part circular ring members 74 is provided with spokes 46. The spokes 46 are integrally formed so as to be connected to the inner circumferential surface of the end-part circular ring member 74. An attachment hole 86 used for receiving a rotating shaft 48 is formed in the center of the spokes 46. The respective arms of the spokes 46 extend radially at equal angular intervals. In the shown embodiment, the end-part circular ring member 74 is formed with three arms. However, the present invention is not limited to this number. It is also possible to form two, four or some other number of arms.

First inner projections 88 are formed between the arms of the spokes 46 on the inner circumferential surfaces of the end-part circular ring member 74. The first inner projections 88 project inwardly.

First attachment holes 88a for attaching the lateral bridge members 82 are opened in the first inner projections 88 and also in the respective arms of the spokes 46. The first attachment holes 88a are positioned on concentric circles centered on the central axis E of the end-part circular ring members 74. The shown embodiment is provided with six first attachment holes 88a. The present invention is not limited to such a number. There are no restrictions on the number of the first attachment holes 88a as long as these holes are formed sufficient to hold in a secure manner the respective intermediate circular ring members 78a and 78b that are disposed between the end-part circular ring members 74. Ordinarily, it is suitable to form three or more first attachment holes 88a.

Furthermore, second inner projections 90 are formed so as to project from the inner circumferential surfaces of each of the end-part circular ring members 74. The second inner projections 90 are provided in point-symmetrical positions centered on the central axis E, and second attachment holes 90a for receiving therein the second lateral bridge members 84 are a opened in the second inner projections 90.

In the shown embodiment, two second attachment holes 90a are provided. However, the present invention is not limited to two second attachment holes 90a. There is no restriction on the number of the second attachment holes 90a as long as the bifurcated projections (described later) of the respective intermediate circular ring members 78a and 78b disposed between the end-part circular ring members 74 can be engaged and the rotation of the respective intermediate circular ring members 78a and 78b relative to the end-part circular ring members 74 are restrained. Ordinarily, it is sufficient to have one second attachment hole 90a. In the shown embodiment, the rotational balance is taken into consideration, and two second attachment holes 90a are disposed in point-symmetrical positions as seen from FIG. 2.

Figure 3:
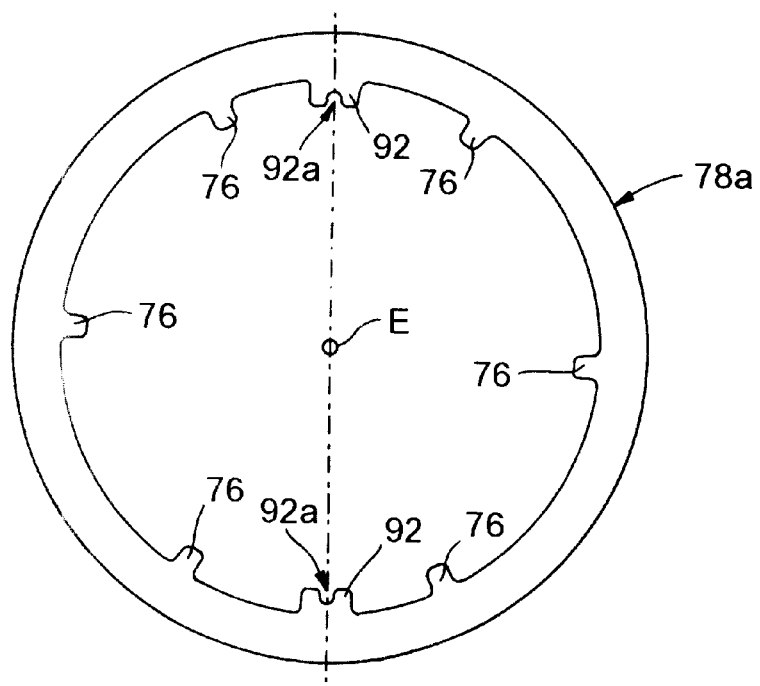
FIG. 3 shows one of the first intermediate circular ring members that make up the strainer of FIG. 1.

FIG. 3 shows the first intermediate circular ring members 78a of the present invention (that correspond to the first circular ring members 14a of the prior art separating apparatus).

As seen from FIG. 3, inward projections 76 are formed so as to project from the inner circumferential surface of each of the first intermediate circular ring members 78a. The inward projections 76 are provided so as to positionally correspond to the first inner projections 88 of the end-part circular ring members 74. The inward projections 76 also positionally correspond to the arms of the spokes 46 (to which the lateral bridge members are attached). Accordingly, in the shown embodiment, a total of six inward projections 76 are provided. Each of the inward projections 76 is formed in the same shape, and this shape is, as seen from FIG. 3, rectangular or in a sector form that is close to rectangular.

Furthermore, bifurcated projections 92 are formed so as to project from the inner circumferential surface of each of the first intermediate circular ring members 78a. The bifurcated projections 92 are provided so as to positionally correspond to the second inner projections 90 of the end-part circular ring members 74. As seen form FIG. 3, each of the bifurcated projections 92 is formed with a recess 92a at the center so that the corresponding second lateral bridge member 84 engages with the recess 92a. The bifurcated projection 92 is in a rectangular shape and is wider compared to the inward projections 76.

Figure 4:
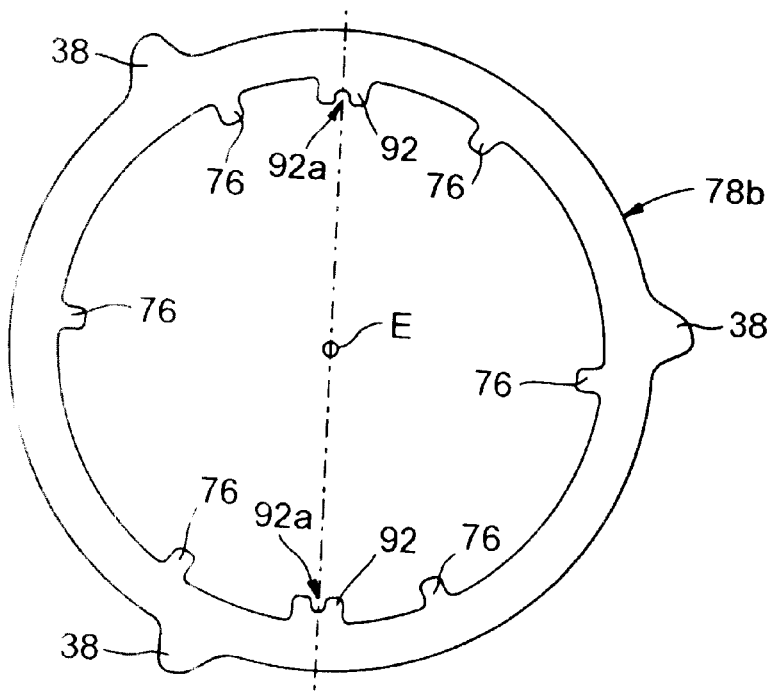
FIG. 4 shows one of the second intermediate circular ring members that make up the strainer of FIG. 1.

FIG. 4 shows one of the second intermediate circular ring members 78b.

The second intermediate circular ring members 78b correspond to the second circular ring members 14b of the prior art apparatus. As seen from FIG. 4, each of the second intermediate circular ring members 78b has substantially the same shape as the first intermediate circular ring members 78a. However, the second intermediate circular ring members 78b differs from the first intermediate circular ring members 78a in that each of the second intermediate circular ring members 78b is provided with a plurality of outer projections 38. In the shown embodiment, three outer projections 38 are provided. The outer projections 38 are formed at specified angular intervals on the outer circumferential surface of the second intermediate circular ring member 78b.

Accordingly, the strainer 72 of the present invention is obtained by arranging a plurality of the respective intermediate circular ring members 78a and 78b side by side or by stacking the ring members sideways between the end-part circular ring members 74. More specifically, a specified number of the first intermediate circular ring members 78a are interposed between each pair of adjacent second intermediate circular ring members 78b. In the shown embodiment, a single first intermediate circular ring member 78a is interposed between two second intermediate circular ring members 78b. Two or three first intermediate circular ring members 78a may be interposed between two second intermediate circular ring members 78b.

Figure 5:
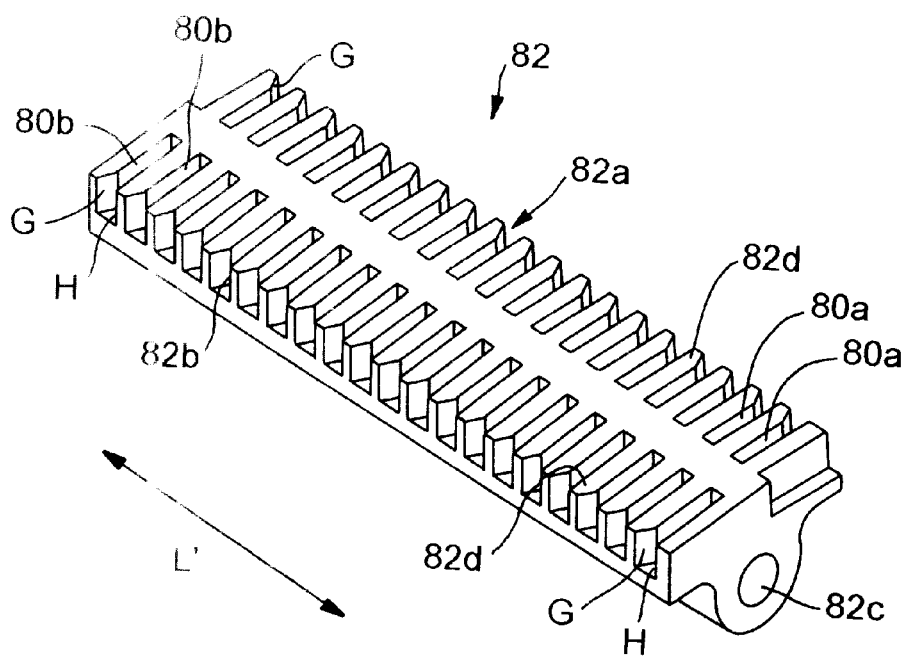
FIG. 5 is a perspective of one type of the lateral bridge member that is installed in the strainer of FIG. 1.

FIG. 5 shows the lateral bridge member 82. The lateral bridge member 82 is formed in a plate-form by molding a synthetic resin and has engaging parts 80. The engaging parts 80 are formed on the outside surfaces (outer circumferential surfaces) of the lateral bridge member 82 so that the engaging parts 80 face the outer circumference of the strainer when the lateral bridge member 82 is mounted, in a plural number, between the pair of end-part circular ring members 74.

The engaging parts 80 are formed in one row on each side 82a and 82b that face in the circumferential direction of the end-part circular ring members 74 (which is also in the circumferential direction of the strainer 72). The engaging parts 80 of the respective rows are formed in positions that are shifted relative to each other, i.e., at staggered positions. Thus, each one of the engaging parts 80 of one side is, as seen from FIG. 5, positioned at mid point between adjacent two engaging parts 80 of another side. In the following description, for convenience, the engaging parts formed on one side 82a are referred to as "the first engaging parts 80a", and the engaging parts formed on another side 82b are referred to as "the second t engaging parts 80b".

Figure 6:
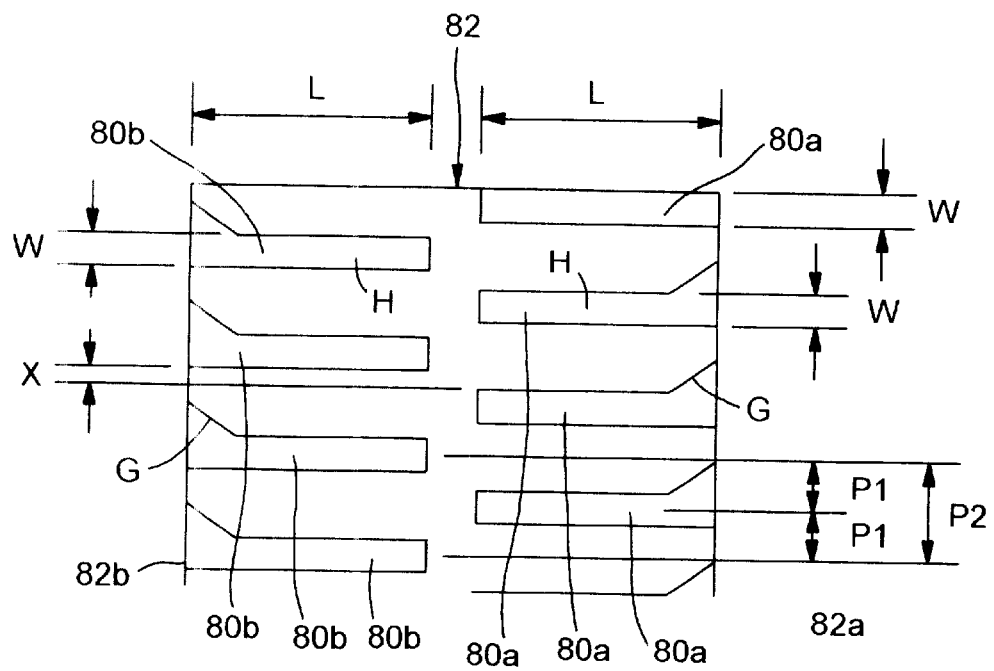
FIG. 6 is an enlarged partial view of the bridge member.

More specifically, as seen from FIG. 6, the opening width W of the respective engaging parts 80a and 80b that are formed in the shape of grooves are the same, and this width W is set at substantially the same dimension as the thickness of the inward projections 76 of the intermediate circular ring members 78a and 78b, so that the inserted inward projections 76 are held without any looseness. Furthermore, the depth (length) L of the respective engaging parts 80a and 80b is set so that the engaging parts on one side do not enter the areas between the engaging parts on another side. In other words, as seen from FIG. 6, the width indicated by two-head arrow W' of the lateral bridge member 82 in the circumferential direction of the strainer 72 is set so that the width W' is greater than 2×L.

Furthermore, the spacing P1 (that is smaller than the opening width W) between the respective engaging parts 80a and 80b is shown by:

$$P1 = X + W/2$$

where X is the spacing of the gaps between the first intermediate circular ring members 78a and the second intermediate circular ring member 78b.

Moreover, the spacing P2 between the respective engaging parts 80 (80a and 80a, 80b and 80b) is shown by:

$$P2 = 2 \times P1$$

Slanted surfaces G are formed in the opening of the respective engaging parts 80a and 80b so that the opening width W increases outwardly. The slanted surfaces G are formed so that the respective engaging parts 80a and 80b can easily receive inward projections 76 of the first and second intermediate circular ring members 78a and 78b. In the lateral bridge member 82 shown in FIG. 6, the slanted surfaces G are formed on only one opening edge of the respective engaging parts 80a and 80b. However, the slanted surfaces can be formed on both opening edges.

Figure 7:
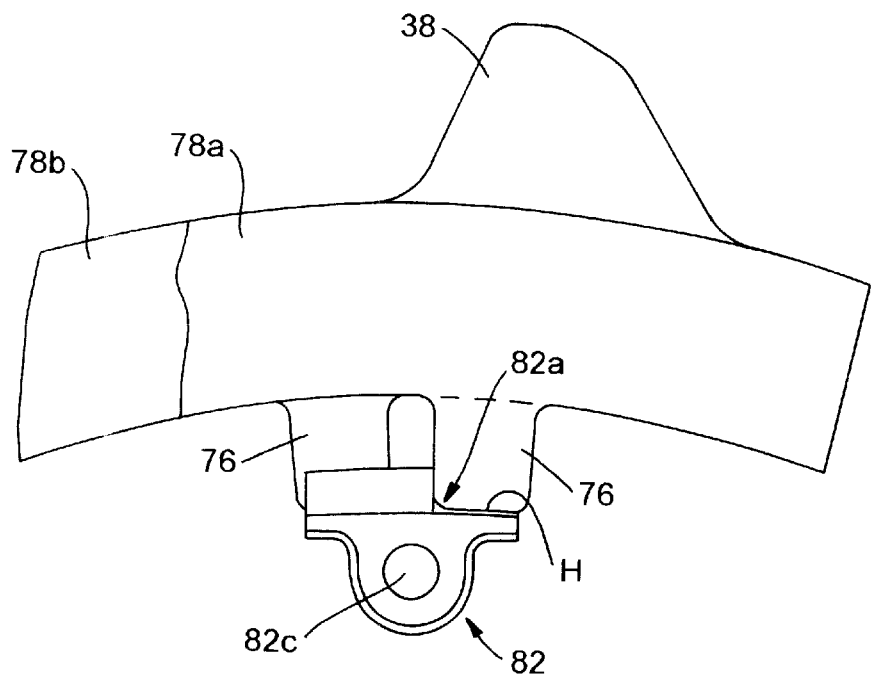
FIG. 7 illustrates an engagement relationship between the bridge member and the intermediate circular ring member.

Furthermore, as seen from FIG. 7, the bottom surface H of each of the engaging parts 80a and 80b is formed in a circular-arc-form cross-sectional shape. This arc shape is formed so that the arc bottom locates on the imaginary circle that is centered on the central axis E of the end-part circular ring members 74 when the lateral bridge members 82 are installed between the end-part circular ring members 74.

When the inward projections 76 of the intermediate circular ring members 78a and 78b are inserted into the respective engaging parts 80a and 80b, the tip ends of the inward A projections 76 make a contact snugly with the bottom surfaces H of the engaging parts 80a and A 80b.

Thus, the respective intermediate circular ring members 78*a* and 78*b* are positioned and held so as to be coaxial with the central axis E of the end-part circular ring members 74.

Each of the lateral bridge members 82 is formed with screw holes 82*c*. The screw holes 82*c* are formed on both end surfaces of each lateral bridge member 82 with respect to the direction of length thereof. The screw holes 82*c* are used for screw-fastening the lateral bridge members 82 to the end-part circular ring members 74.

In the shown embodiment, the engaging parts 80 of each lateral bridge member 82 are grooves. However, the lateral bridge members 82 can be formed in a comb-form structure so that the slits between the respective teeth of the comb-form structure are used as the engaging parts.

Figure 8:
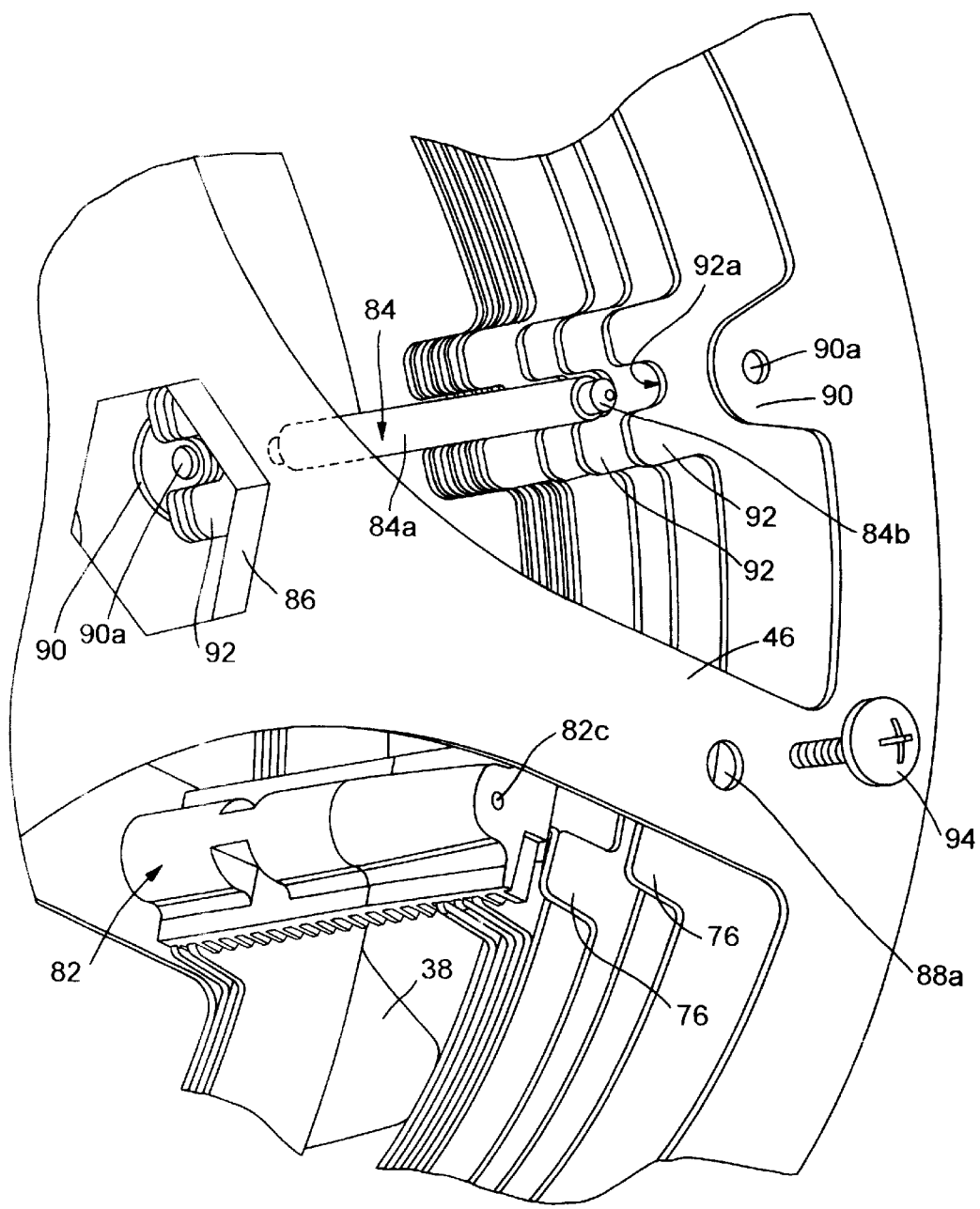
FIG. 8 is a perspective view of a part of the strainer being assembled.

As seen from FIG. 8, each of the second lateral bridge members 84 is formed with columnar projections 84*b* of a smaller diameter, The projections 84*b* are provided on both end surfaces of a cylindrical body 84 of the second lateral bridge member 84. The cylindrical body 84*a* has the length that conforms to the length of the lateral bridge members 82. The diameter of the columnar projections 84*b* is set so that the columnar projections 84*b* are inserted into the second attachment holes 90*a* of the second inner projections 90 of the end-part circular ring members 74. The diameter of the cylindrical body 84*a* of the second lateral bridge member 84 is larger than the second attachment holes 90*a*.

Next, the assembled structure of the strainer 72 will be described along with the assembly steps.

First, the lateral bridge members 82 (six bridge members 82 in the shown embodiment) are screw-fastened to one of the end-part circular ring members 74 using the first attachment holes 88*a*. As a result, a plurality of (or six) lateral bridge members 82 are disposed in an upright position with respect to the surface of the end-part circular ring member 74.

The end-part circular ring member 74 to which the lateral bridge members 82 are thus attached is placed in a horizontal position, and the first intermediate circular ring members 78*a* and second intermediate circular ring members 78*b* are alternately mounted so that all the lateral bridge members 82*a* and 82*b* are positioned inside the intermediate circular ring members 78*a* and 78*b*.

When mounting the intermediate circular ring members 78*a* and 78*b*, the inward projections 76 of the respective intermediate circular ring members 78*a* and 78*b* are shifted so that they do not interfere with the lateral bridge members 82, then the respective intermediate circular ring members 78*a* and 78*b* are slightly rotated, and the inward projections 76 of the respective intermediate circular ring members 78*a* and 78*b* are inserted into the respective corresponding engaging parts 80*a* and 80*b* of the lateral bridge members 82.

As a result, the respective intermediate circular ring members 78*a* and 78*b* are held by the lateral bridge members 82 with specified gaps between the intermediate circular ring members 78*a* and 78*b*, and all the intermediate circular ring members are installed between the end-part circular ring members 74.

Next, after all the intermediate circular ring members 78*a* and 78*b* are installed, one end of the rotating shaft 48 is brought into the attachment hole 86 of the end-part circular ring member 74 positioned as the lowermost layer, and the rotating shaft 48 is stood upright.

Then, the columnar projections 84*b* of the second lateral bridge members 84 are inserted into the second attachment holes 90*a* that are opened in the second inner projections 90 of the end-part circular ring member 74. The bifurcated projections 92 of the respective intermediate circular ring members 78*a* and 78*b* are overlapped with each other with the respective inward projections 76 thereof inserted in the engaging parts 80*a* and 80*b* of the lateral bridge members 82. Accordingly, the second lateral bridge members 84 are brought to be engaged with the recesses 92*a* of the bifurcated projections 92 of the respective intermediate circular ring members 78*a* and 78*b*.

The remaining end-part circular ring member 74 (on another side) is placed on the upper surface of the intermediate circular ring members 78*a* and 78*b* that are in stacked fashion. Also, the other end of the rotating shaft 48 is inserted into the attachment hole 86 formed in the spokes 46, and the columnar projections 84*b* formed on the other ends of the second lateral bridge members 84 are inserted into the second attachment holes 90*a* of the second inner projections 90.

In this state, the first attachment holes 88*a* that are opened in the first inner projections 88 and in the respective arms of the spokes 46 of the end-part circular ring member 74 coincide with the screw holes 82*c* that are opened in the other ends of the upright lateral bridge members 82.

Lastly, as shown in FIG. 8, screws 94 (only one screw shown) are screwed into the screw holes 82*c* of the lateral bridge members 82 via the respective first attachment holes 88*a* of the end-part circular ring member 74. As a result, the end-part circular ring members 74 are attached to the lateral bridge members 82.

The assembly of the strainer 72 is thus completed as shown in FIG. 1. In FIG. 1, some of the intermediate circular ring members 78*a* and 78*b* are omitted so as to show the lateral bridge members 82.

FIGS. 9A and 9B respectively show the section of the strainer 72 of FIG. 1. These cross sections are viewed along a plane passing through the central axis E.

In the above-described strainer 72, the gaps between the respective circular ring members 74, 78*a* and 78*b* are determined by the opening width W and the pitch P1 between the respective engaging parts 80*a* and 80*b* of the respective lateral bridge members 82 that are installed between the pair of end-part circular ring members 74. Accordingly, there is no need to interpose spacers 44 that are, as shown in the prior art separating apparatus, installed between the respective circular ring members 14*a* and 14*b*. Thus, the assembly work is simple in the present invention.

Furthermore, the spacing between the pair of end-part circular ring members 74 is determined by the length of the lateral bridge members 82, and the bridge members 82 are manufactured by resin molding within fixed tolerances in dimensions for various portions thereof. Accordingly, no cumulative error occurs even in cases where there is a variation in the thickness of the respective circular ring members 74, 78*a* and 78*b*. Thus, the strainer 72 does not have great variations in dimension.

Figure 10:
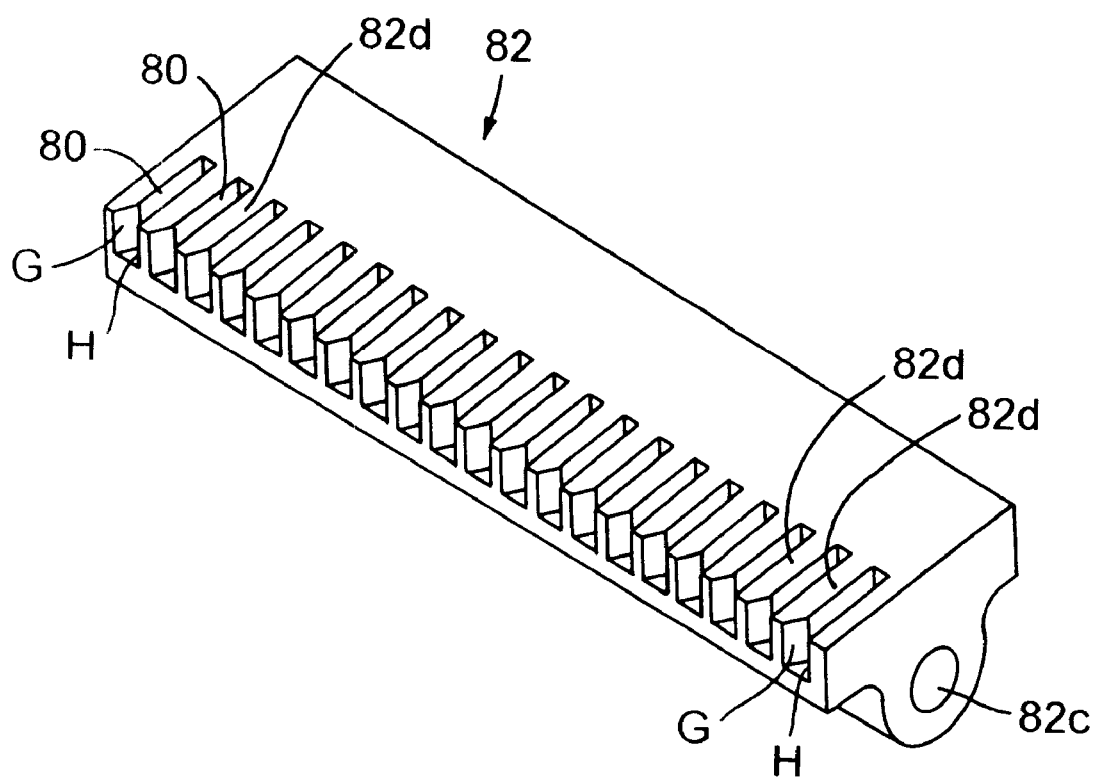
FIG. 10 is a perspective view of another type of the lateral bridge member installed in the strainer of FIG. 1.
Figure 11:
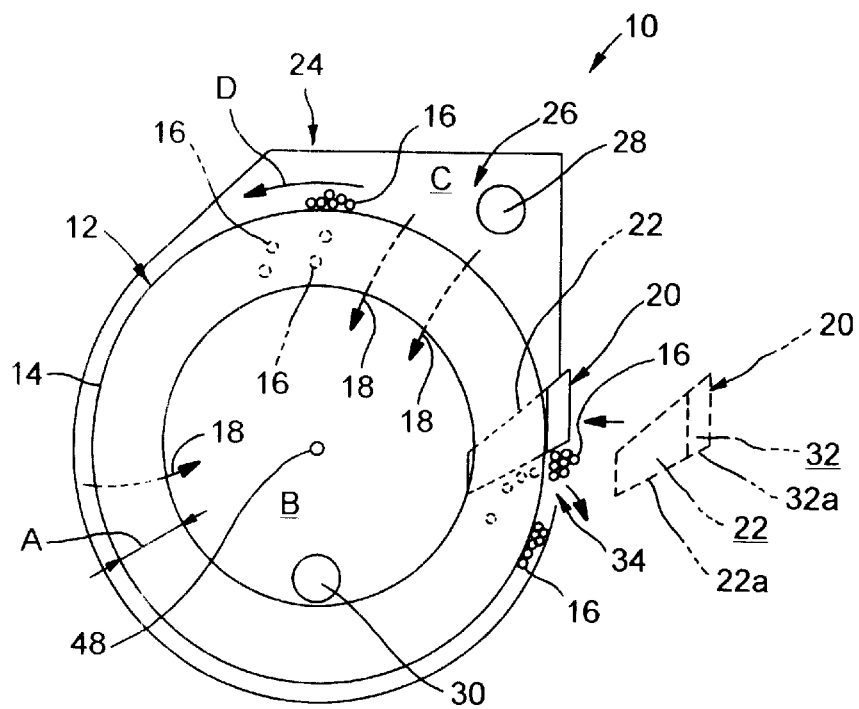
FIG. 11 is an explanatory diagram illustrating the concept of a solid-liquid separating apparatus of prior art.
Figure 12:
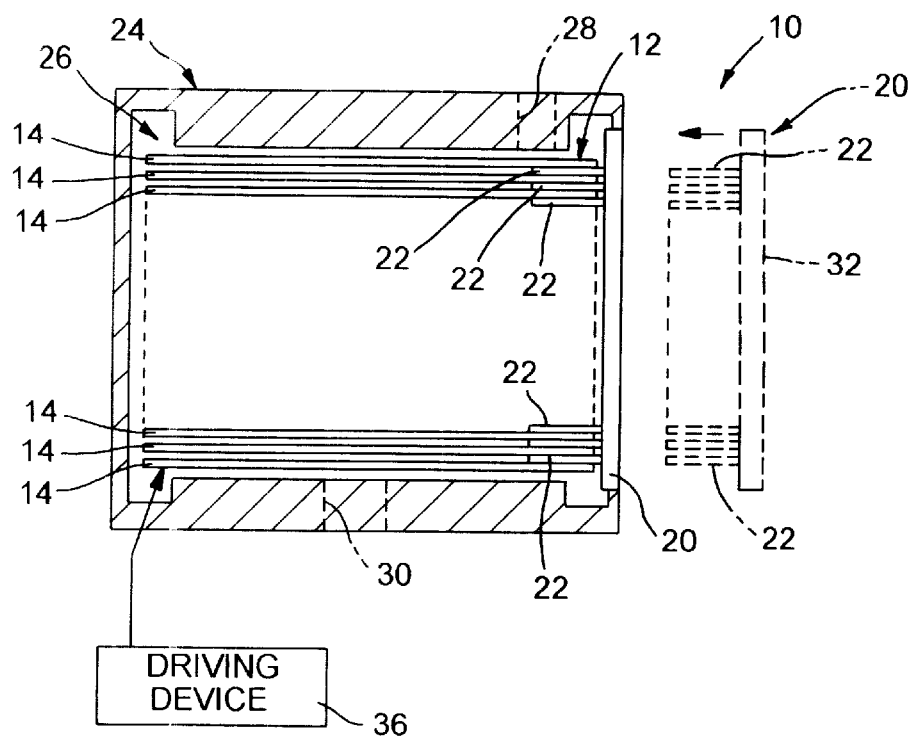
FIG. 12 is a sectional view taken along the direction of the rotating shaft of the separating apparatus of FIG. 11.

In each of the above lateral bridge members 82, the engaging parts 80*a* and 80*b* are formed in a staggered configuration. However, the engaging parts 80 may be formed on only one side of the lateral bridge member 82 as shown in FIG. 10.

When the engaging parts 80 are formed on only one side of the lateral bridge member 82, the spacing of the gaps between the circular ring members 74, 78*a* and 78*b* is equal to the thickness of the wall parts 82*d* between the respective engaging parts 80. However, with the strength and the structure of the mold used for resin molding, etc. in consideration, the thickness of the wall parts 82*d* cannot be made too thin. As a result, the gaps between the respective circular ring members 78a and 78b likewise cannot be made too narrow. On the other hand, when the engaging parts 80a and 80b are formed in a staggered configuration in each bridge member 82, the distance X between the engaging parts 80a and the engaging parts 80b that are formed in respectively different single rows makes the spacing of the gaps between the respective circular ring members 78a and 78b. Accordingly, the gaps between the respective circular ring members 78a and 78b can be made narrower with the thickness of the wall parts 82d between adjacent engaging parts 80a and adjacent engaging parts 80b on both sides of each lateral bridge member 82 being set at a dimension that maintains a sufficient strength.

The above embodiments are described with reference to a solid-liquid separating apparatus that is used in a raw contaminant dehydration treatment device and separates pulverized raw contaminants and water. It goes without saying that the present invention can be used for other than the separation of raw contaminants and water.

As seen from the above, according to the present invention, there is no need for passing first stays through a plurality of circular ring members, aligning spacers and fitting spacers over the first stays so that the spacers are disposed between the respective circular ring members as in the prior art. Thus, the present invention provides high working characteristics.

Furthermore, the total length of the strainer that is formed by installing the circular ring members side by side is determined by the length of the lateral bridge members (more specifically, by the length that is obtained by adding the plate thickness of the end-part circular ring members to the length of the lateral bridge members). Accordingly, cumulative errors caused by variations in the plate thickness of the circular ring members are not generated. The manufacturing costs can be reduced, and the quality of the solid-liquid separating apparatus can be improved.

What is claimed is:

1. A solid-liquid separating apparatus comprising:
   a strainer comprised of a plurality of flat-plate-form circular ring members disposed adjacent to each other with gaps in between, thus being in a cylindrical body;
   a casing having an accommodating section that accommodates therein said strainer, said accommodating section being divided by said strainer into an internal region that is inside said strainer and an external region that is outside said strainer, said external region being formed with an intake port that introduces a mixture of solid matter and liquid, and said internal region being formed with an outlet port that discharges to outside said liquid that passes between said circular ring members and advances into said internal region; and
   a scraper having flat-plate-form protruding elements whose tip ends advance into said gaps between said circular ring members, said scraper moving along outer circumferential surfaces of said circular ring members so as to scrape away said solid matter adhering to said circular ring members;
   wherein said strainer is comprised of:
      a pair of end-part circular ring members disposed at both ends of said strainer,
      a plurality of intermediate circular ring members which are installed between said pair of end-part circular ring members and have inward projections that project from inner circumferential surfaces thereof,
      a plurality of lateral bridge members installed between said pair of end-part circular ring members, each of said bridge members being formed with a plurality of engaging parts that engage with said inward projections of said intermediate circular ring members and hold said intermediate circular ring members with said gaps in between, said engaging parts being formed a direction perpendicular to an axis of said strainer; and
   said engaging parts are formed on at least one of a front and a back side of each of said lateral bridge members in a circumferential direction of said strainer, thus being staggered in rows.

2. The solid-liquid separating apparatus according to claim 1, further comprising:
   bifurcated projections formed on an inner circumferential surface of each of said intermediate circular ring members, and
   a plurality of second lateral bridge members provided between said pair of end-part circular ring members, said second lateral bridge members being engaged with said bifurcated projections, thus restricting rotation of said intermediate circular ring members relative to said end-part circular ring members.

3. A solid-liquid separating apparatus comprising:
   a strainer comprised of a plurality of flat-plate-form circular ring members disposed adjacent to each other with gaps in between, thus being in a cylindrical body;
   a casing having an accommodating section that accommodates therein said strainer, said accommodating section being divided by said strainer into as internal region that is inside said strainer and an external region that is outside said strainer, said external region being formed with an intake port that introduces a mixture of solid matter and liquid, and said internal region being formed with an outlet port that discharges to outside said liquid that passes between said circular ring members and advances into said internal region; and
   a scraper having flat-plate-form protruding elements whose tip ends advance into said gaps between said circular ring members, said scraper moving along outer circumferential surfaces of said circular ring members so as to scrape away said solid matter adhering to said circular ring members;
   wherein said strainer is comprised of:
      a pair of end-part circular ring members disposed at both ends of said strainer,
      a plurality of intermediate circular ring members which are installed between said pair of end-part circular ring members and have inward projections that project from inner circumferential surfaces thereof,
      a plurality of lateral bridge members installed between said pair of end-part circular ring members, each of said bridge members being formed with a plurality of engaging parts that engage with said inward projections of said intermediate circular ring members and hold said intermediate circular ring members with said gaps in between, said engaging parts being formed a direction perpendicular to an axis of said strainer; and further comprising:
         bifurcated projections formed on an inner circumferential surface of each of said intermediate circular ring members, and
         a plurality of second lateral bridge members provided between said pair of end-part circular ring members, said second lateral bridge members being engaged with said bifurcated projections, thus restricting rotation of said intermediate circular ring members relative to said end-part circular ring members.

4. A solid-liquid separating apparatus comprising:
- a strainer comprised of a plurality of flat-plate-form circular ring members disposed adjacent to each other with gaps in between, thus being in a cylindrical body;
- a casing having an accommodating section that accommodates therein said strainer, said accommodating section being divided by said strainer into an internal region that is inside said strainer and an external region that is outside said strainer, said external region being formed with an intake port that introduces a mixture of solid matter and liquid, and said internal region being formed with an outlet port that discharges to outside said liquid that passes between said circular ring members and advances into said internal region; and
- a scraper having flat-plate-form protruding elements whose tip ends advance into said gaps between said circular ring members, said scraper moving along outer circumferential surfaces of said circular ring members so as to scrape away said solid matter adhering to said circular ring members;

wherein said strainer is comprised of:
- a pair of end-part circular ring members disposed at both ends of said strainer,
- a plurality of intermediate circular ring members which are installed between said pair of end-part circular ring members and have inward projections that project from inner circumferential surfaces thereof,
- a plurality of lateral bridge members installed between said pair of end-part circular ring members, each of said bridge members being formed with a plurality of engaging parts that engage with said inward projections of said intermediate circular ring members and hold said intermediate circular ring members with said gaps in between, said engaging parts being formed a direction perpendicular to an axis of said strainer; and said engaging parts are provided on a back side of each of said lateral bridge members in a circumferential direction of said strainer, and further comprising:
- bifurcated projections formed on an inner circumferential surface of each of said intermediate circular ring members, and
- a plurality of second lateral bridge members provided between said pair of end-part circular ring members, said second lateral bridge members being engaged with said bifurcated projections, thus restricting rotation of said intermediate circular ring members relative to said end-part circular ring members.

* * * * *